US005902036A

United States Patent [19]

Serizawa et al.

[11] Patent Number: 5,902,036

[45] Date of Patent: May 11, 1999

[54] LAMP DEVICE FOR A VEHICLE

[75] Inventors: Hiroyuki Serizawa; Hiroyuki Ishida, both of Shizuoka, Japan

[73] Assignee: Koito Manufacturing Co., Ltd., Tokyo, Japan

[21] Appl. No.: 08/763,834

[22] Filed: Dec. 12, 1996

[30] Foreign Application Priority Data

Dec. 13, 1995 [JP] Japan .................................... 7-346247

[51] Int. Cl.[6] ................................ B60Q 1/04; F21V 7/04

[52] U.S. Cl. ............................ 362/308; 362/309; 362/61; 362/351

[58] Field of Search .................................... 362/308, 309, 362/61, 328, 305, 327, 347, 351

[56] References Cited

U.S. PATENT DOCUMENTS 4,642,740 2/1987 True ........................................ 362/308
5,299,101 3/1994 Serizawa .................................. 362/61

*Primary Examiner*—Thomas M. Sember

*Attorney, Agent, or Firm*—Sughrue, Mion, Zinn, Macpeak & Seas, PLLC

[57] ABSTRACT

A lamp device for a vehicle is configured by a reflecting mirror, a lens in which lens steps for diffusing light are formed, and a light source positioned between the reflecting mirror and the lens. The reflecting mirror is divided into two portions by the vertical plane including the main optical axis of the reflecting mirror. A reflecting face is formed in the following manner. Reflected light from a portion which is positioned in one side with respect to the vertical plane propagates in a direction which is inclined with respect to the main optical axis and without intersecting the vertical plane including the main optical axis, and is then emitted through the lens steps formed in one portion of the lens. Reflected light from a portion which is positioned in the other side with respect to the vertical plane including the main optical axis propagates in a direction which is inclined with respect to the main optical axis and without intersecting the vertical plane including the main optical axis, and is then emitted through the lens steps formed in the other portion of the lens.

9 Claims, 10 Drawing Sheets

LAMP DEVICE FOR A VEHICLE

BACKGROUND OF THE INVENTION

The invention relates to a lamp device for a vehicle in which a local high temperature portion is not produced in a lens and lens steps can be easily designed.

FIG. 11 schematically shows the configuration of a prior art lamp device. The lamp device a comprises a reflecting mirror b, a light source c, and a lens d which is disposed in front of these components (it is assumed that the irradiation direction of the lamp device a is directed to the front).

In the figure, "L—L" indicates the main optical axis of the reflecting mirror b. The light emission center of the light source c is positioned on the main optical axis L—L. In light emitted from the light source c, light directed to the reflecting mirror b is reflected from the reflecting face of the reflecting mirror b and then forward emitted while being diffused mainly in horizontal directions by lens steps e formed on the lens d.

In the case where a screen SCN is disposed in front of the lamp device a so as to be separated by a sufficient distance from the lamp device and a line where the vertical plane including the main optical axis L—L intersects the screen SCN (in the figure, the line is indicated by a point N) is set, reflected light from a portion b1 of the reflecting mirror b which is positioned in the left side of the figure with respect to the vertical plane including the main optical axis L—L propagates as indicated by light rays f so as to impinge on a range (indicated by "AR" in the figure) of the screen SCN which is positioned on the right side of the point N. By contrast, reflected light from a portion br of the reflecting mirror b which is positioned in the right side of the figure with respect to the vertical plane including the main optical axis L—L propagates as indicated by light rays g so as to impinge on a range (indicated by "AL" in the figure) of the screen SCN which is positioned on the left side of the point N.

In the above-described lamp device a, the correlations between the reflecting face of the reflecting mirror b and the irradiation ranges on the screen SCN are inverted with respect to the vertical plane including the main optical axis of the reflecting mirror b. Therefore, such a lamp device has a problem in that reflected light tends to be concentrated to the center portion of the lens d.

This will be described more specifically. Reflected light from the portion b1 of the reflecting mirror b, and that from the portion br propagate so as to intersect the main optical axis L—L, and impinge on the ranges AR and Al which are oppositely positioned with respect to the point N, respectively. Consequently, light is concentrated to a region h of the lens d which is near the main optical axis L—L, with the result that the temperature of the area is locally raised. In the case where the lens d is made of a resin material, therefore, this local temperature rise causes the lens d to be thermally deformed or partially melt. In the case where the lens d is made of a glass material, when a hand erroneously contacts the surface of the lens, the hand may burn because of the high temperature of the lens d.

The lens steps formed in the region h of the lens d must be designed so that they can control the reflected light rays f and g from both the portions b1 and br of the reflecting mirror b. Therefore, the control of directing both the irradiation light rays so as to satisfy the light distribution standard causes the design of the lens to be difficult to do.

SUMMARY OF THE INVENTION

The problem which is to be solved by the invention is to prevent a local high temperature region from being produced in a lens and facilitate the design of lens steps formed in the lens.

In order to solve the problem, the lamp device for a vehicle of the invention is configured in the following manner. The whole of reflected light from reflecting regions respectively positioned in both the sides of a reflecting mirror with respect to the vertical plane which includes the main optical axis of the reflecting mirror and which divides the reflecting mirror into two regions, or reflected light from a part of the reflecting regions propagates in a direction which is inclined with respect to the main optical axis of the reflecting mirror and without intersecting the vertical plane which includes the main optical axis of the reflecting mirror, and, when the lens is divided into two portions by the vertical plane which includes the main optical axis of the reflecting mirror, is emitted through lens steps formed in portions of the lens, the portions respectively corresponding to the reflecting regions or the part of the reflecting regions.

According to the invention, therefore, reflected light from the reflecting regions or a part thereof does not concentrically pass through a certain range of the lens but passes through the lens with being distributed to the whole of the lens.

DETAILED DESCRIPTION OF THE INVENTION

Figure 1:
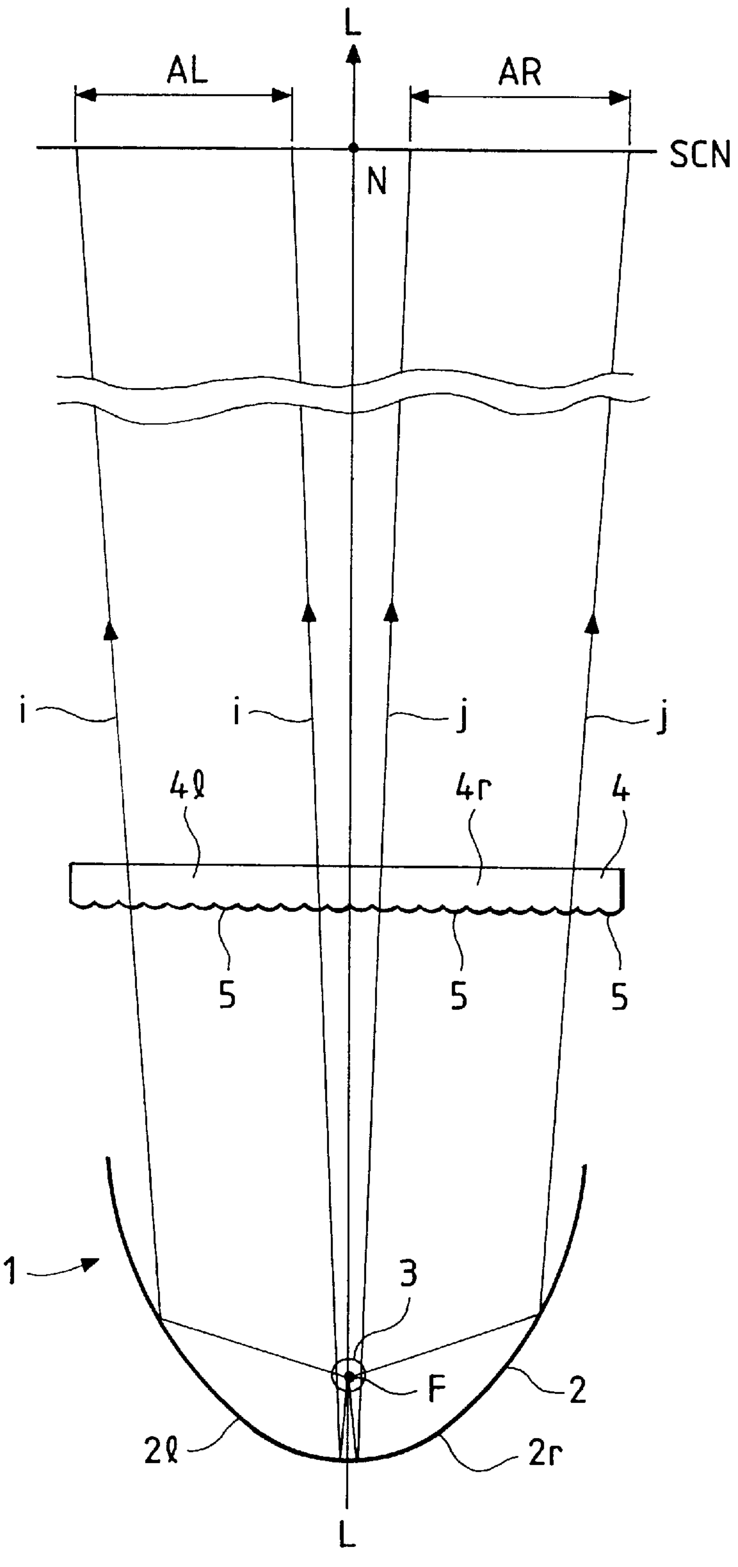
FIG. 1 is a horizontal transverse section view schematically showing the configuration of the lamp device for a vehicle of the invention.

FIG. 1 schematically shows the configuration of the lamp device for a vehicle of the invention. The lamp device for a vehicle 1 comprises a reflecting mirror 2, a light source 3, and a lens 4.

In the figure, "L—L" indicates the main optical axis of the reflecting mirror 2. The light emission center F of the light source 3 is substantially positioned on the main optical axis L—L. An incandescent lamp or a discharge lamp may be used as the light source 3. In the case of using an incandescent lamp, for example, it is assumed that the ideal shape of the filament is cylindrical, and the center axis of the filament is set so as to be perpendicular to the main optical axis L—L or elongate along the main optical axis L—L. In the case of using a discharge lamp, an end portion of a crescent ark is set so as to be on or in the vicinity of the main optical axis L—L and the light emission center of the ark is set so as to be slightly higher than the main optical axis L—L. Actually, the light source has a size. Generally, therefore, the focal point of the reflecting mirror 2 or a reference point for the formation of the reflecting mirror 2 is not always coincident with the light emission center F.

The lens 4 is positioned in front of the reflecting mirror 2 (it is assumed that the irradiation direction of the lamp device 1 is directed to the front). Lens steps 5 having a function of diffusing light mainly in horizontal directions are formed in the lens 4. The light distribution pattern of the lamp device is formed by subjecting light reflected from the reflecting mirror 2 to the action of the lens steps 5 and then forward emitting the light.

In the case where a screen SCN is disposed in front of the lamp device 1 so as to be separated by a sufficient distance from the lamp device and a line where the vertical plane including the main optical axis L—L intersects the screen SCN (in the figure, the line is indicated by a point N) is set, reflected light from a reflecting face of a portion 21 of the reflecting mirror 2 which is positioned in the left side of the figure with respect to the vertical plane including the main optical axis L—L propagates as indicated by light rays i in a direction which is inclined with respect to a line parallel to the main optical axis L—L of the reflecting mirror 2, and then impinges on a range (indicated by "AL" in the figure) of the screen SCN which is positioned on the left side of the point N. By contrast, reflected light from a reflecting face of a portion **2*r* of the reflecting mirror 2 which is positioned in the right side of the figure with respect to the vertical plane including the main optical axis L—L propagates as indicated by light rays j in a direction which is inclined with respect to a line parallel to the main optical axis L—L of the reflecting mirror 2**, and then impinges on a range (indicated by "AR" in the figure) of the screen SCN which is positioned on the right side of the point N.

In other words, the shape of the reflecting face of each portion of the reflecting mirror 2 is defined so that reflected light from both the portions 21 and **2*r* of the reflecting mirror 2 impinges without intersecting the vertical plane which includes the main optical axis L—L on the ranges AL and AR which are respectively positioned on the same sides with respect to the point N. When the reflected right rays i and j pass through the lens, therefore, there is no region where light is locally concentrated, and the temperature of the lens 4 is prevented from being locally raised. Among the lens steps 5, the lens steps which are formed in the portion 41 (the left portion in the figure) of lens 4 positioned on one side with respect to the vertical plane including the main optical axis L—L acts on light reflected from the portion 21 of the reflecting mirror 2, and those which are formed in the portion 4*r* (the right portion in the figure) of the lens 4 positioned on the other side with respect to the vertical plane including the main optical axis L—L acts on light reflected from the portion 2*r* of the reflecting mirror 2. Consequently, the lens steps of the portions can be independently designed. In other words, the lens 4 has no region where, when reflected light rays i and j pass through the lens 4, the reflected light rays overlap each other or has such a region of a very small area, and hence the optical design of the lens steps of the one portion 41 (or 4*r*) of the lens 4 can be conducted with considering only the shape of the reflecting face of the one portion 21 (or 2*r*) of the reflecting mirror 2**.

Figure 2:
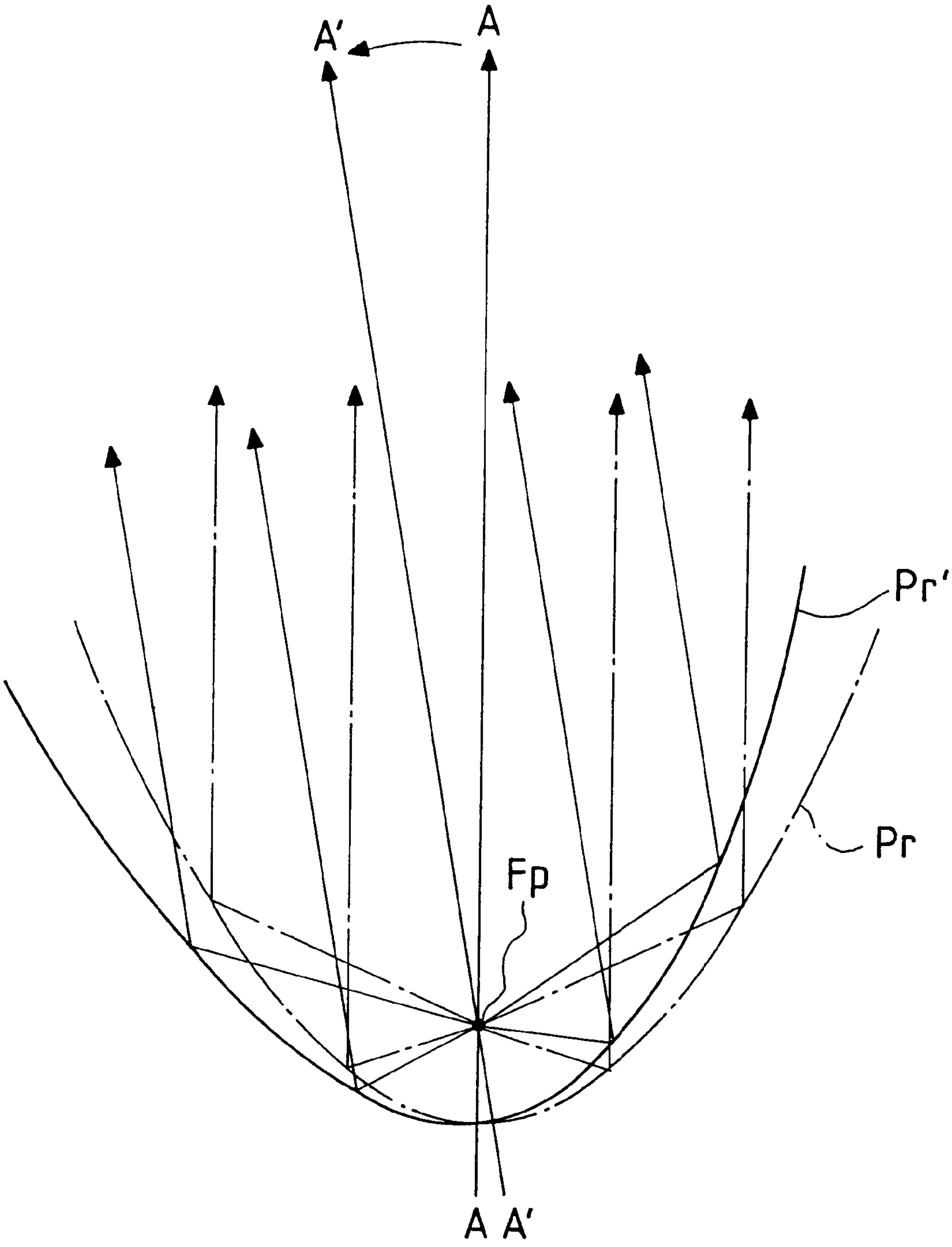
FIG. 2 is a diagram illustrating inclination of the axis of revolution of a paraboloid of revolution.

The shape of the reflecting face of the reflecting mirror 2 can be realized in the simplest manner by a method in which the axis of revolution (coincident with the optical axis and indicated by "A—A") of a paraboloid of revolution pr such as shown in FIG. 2 (in the figure, the paraboloid of revolution is indicated as a parabola of a one-dot chain line) is inclined in a predetermined direction. As well known, when a point light source is placed at the focal point Fp of the paraboloid of revolution pr, reflected light from the paraboloid of revolution pr is parallel to the axis of revolution A—A. As apparent from this, a part of a paraboloid of revolution pr' (in the figure, indicated as a parabola of a solid line) which is obtained by rightward or leftward inclining the axis of revolution A—A with respect to the point Fp in the horizontal plane including the axis as indicated by "A'-A'" in the figure can be used as the reflecting faces of the portions 21 and **2*r* of the reflecting mirror 2**.

In place of conducting this method using a paraboloid of revolution, a reflecting face of a shape having a function of diffusing light in horizontal directions may be used in such a manner that the reference axis of the face is inclined. For example, a reflecting face which is disclosed by the assignee of the present patent application in Japanese patent publication (Kokai) No. SHO50-127487 may be used (the reflecting face has the reference axis in the horizontal plane including the optical axis, and, when the optical axis is set to be the x-axis and the horizontal and vertical axes perpendicular to the optical axis are respectively set to be the y- and z-axes, the reference axis is indicated by "$y^2=4\cdot f\cdot x+a\cdot x^n$" where "f" is the focal length and "a" and "n" are constants). As an example of a free-form curved face which cannot be easily expressed by an analytic algebraic expression, a reflecting face which is disclosed by the assignee of the present patent application in Japanese patent publication (Kokai) No. HEI4-248201 may be used. The latter case where a free-form curved face is used has an advantage in that the direction of reflected light can be freely controlled at an arbitrary position of the curved face, and also another advantage in that segment regions constituting the reflecting face of a reflecting mirror can be made smoothly continuous to each other without forming a level difference (which causes glare) at interfaces of the segment regions. When the reflecting mirror is divided into two portions by the horizontal plane including the main optical axis of the reflecting mirror and the reflecting face of the portion positioned substantially higher than the horizontal plane is formed into a shape of a paraboloid of revolution, for example, the reflecting face of the portion positioned substantially lower than the horizontal plane can be made smoothly continuous to that of the higher portion (generally, it is preferable that continuity of an n-th differential (where n is a natural number) is ensured at the interface).

In the above, the reflecting face of the reflecting mirror 2 is completely divided into two regions with respect to the vertical plane including the main optical axis L—L. The invention may be realized even in the case where only a partial region of the reflecting face has an irradiation tendency for reflected light such as that shown in FIG. 1. Specifically, when a reflecting mirror is divided for convenience's sake into two regions by the vertical plane including the main optical axis L—L, the face shapes of the regions may be defined so that a partial region of the reflecting face positioned on one side with respect to the vertical plane including the main optical axis L—L, and another partial region positioned on the other side exhibit the same reflection functions as those of the portions 21 and **2*r* of the reflecting mirror 2**.

When the correlations between the reflecting faces of the reflecting mirror 2 and the irradiation ranges on the screen SCN shown in FIG. 1 are employed, there is the following advantage in disposition of a shade which surrounds the light source 3.

Figure 3:
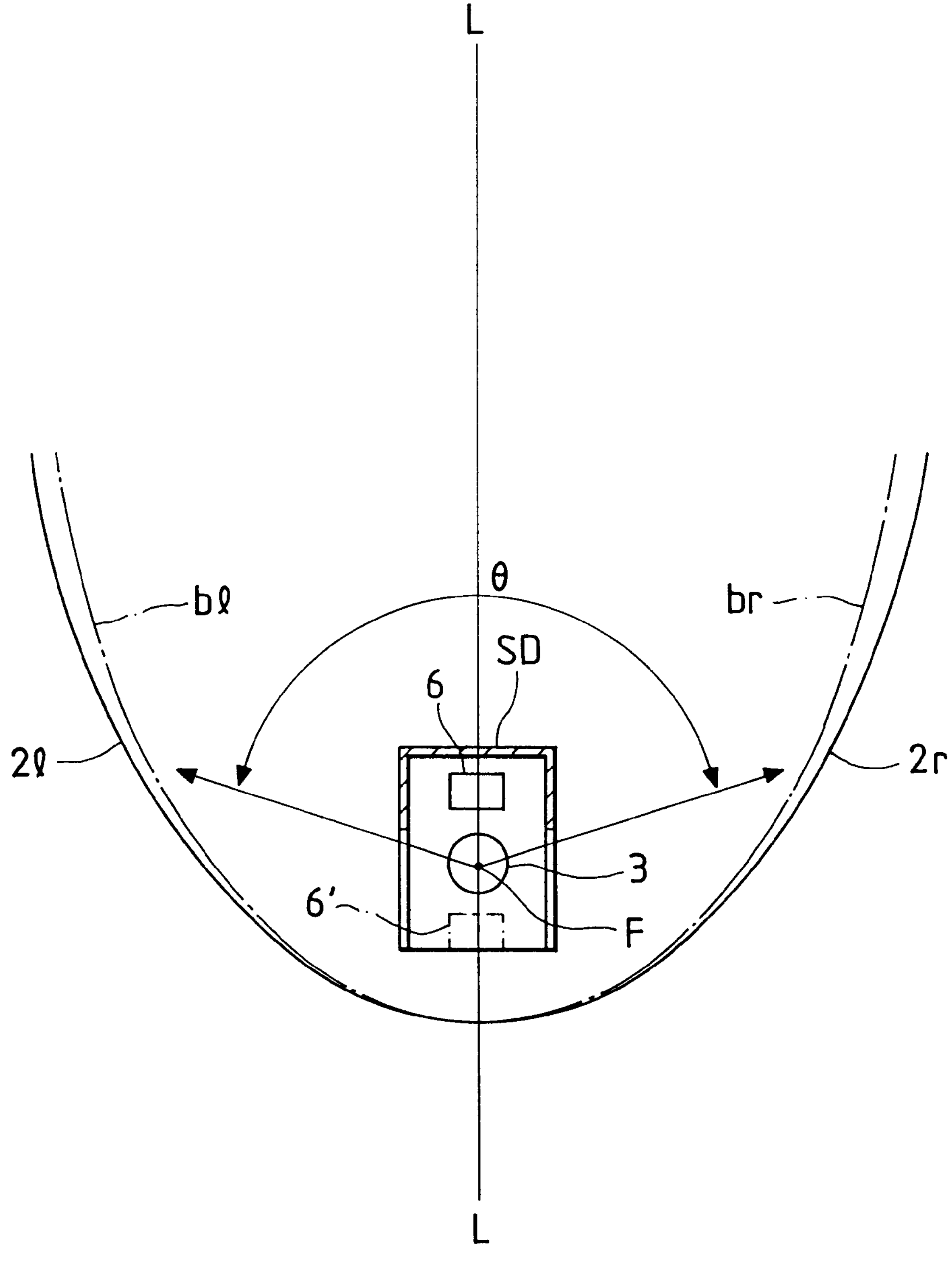
FIG. 3 is a diagram illustrating relationships between a support portion for a shade and reflecting faces.

A shade is disposed largely for the purpose of preventing light emitted from the light source from directly entering the lens. In FIG. 3, for example, a shade SD is positioned with respect to the light source 3 so that the shade intercepts direct light which is emitted from the light source 3 and in the range indicated by a solid angle θ and the light in the other range impinges on the reflecting face of the reflecting mirror.

The shade SD must be fixed to the reflecting mirror by some type of fixing means. In order to realize this, employed is a method in which a post for attaching the shade SD to the reflecting mirror is formed on the shade and the post is attached to the reflecting mirror, that in which a support portion for supporting the shade SD is formed on the reflecting mirror and the shade SD is attached to the support portion, or that in which these two methods are combinedly used.

Figure 11:
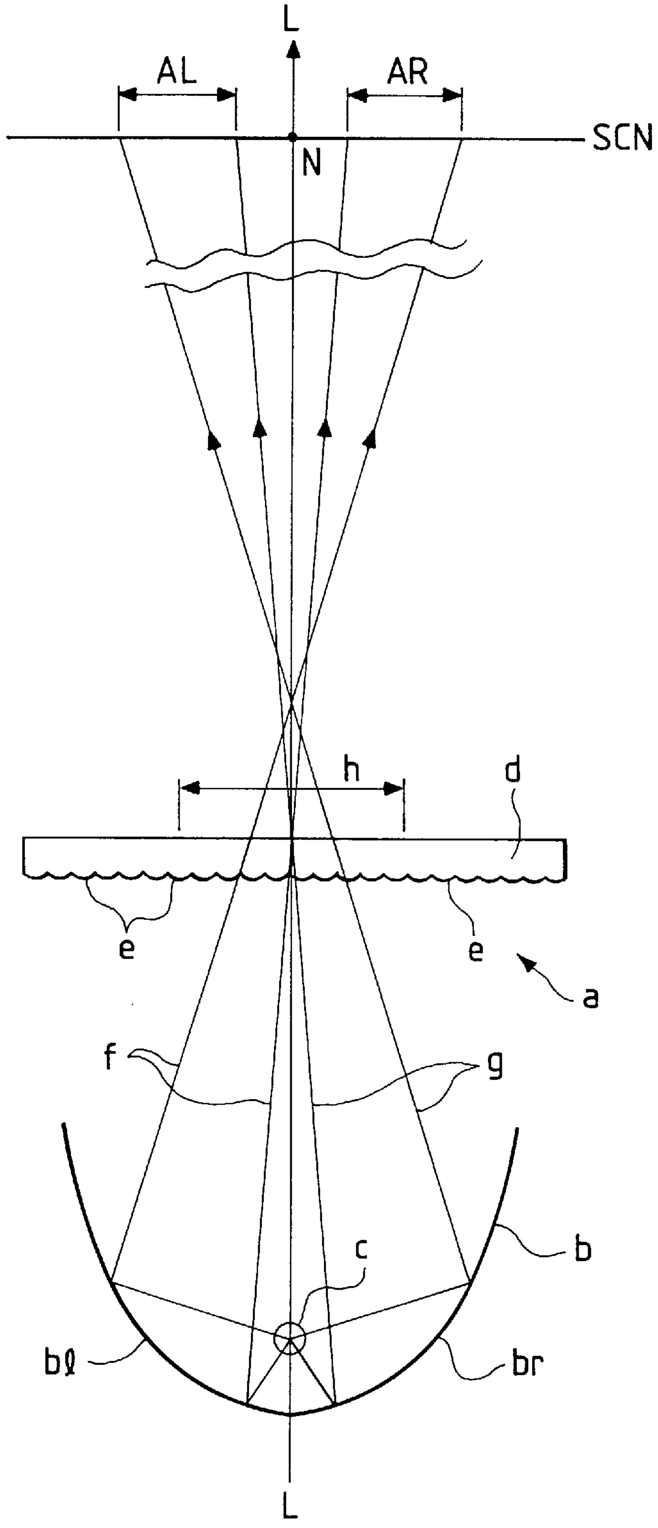
FIG. 11 PRIOR ART
FIG. 11 is a horizontal section view schematically illustrating problems of the prior art.

In the case where the reflecting face of the reflecting mirror and the irradiation ranges on the screen SCN correlate with each other as shown in FIG. 11, however, the post or the support portion for the shade SD adversely affects propagation of reflected light. When the post or the support portion for the shade SD is disposed at a position closer to the front end of the shade SD as indicated by a rectangle 6 of a solid line in FIG. 3, the post or the support portion for the shade SD interferes with reflected light from the reflecting faces of both the portions b1 and br of the reflecting mirror which are indicated by one-dot chain lines in the figure, and a shadow of the post or the support portion influences the light distribution.

In order to reduce such influence, the post or the support portion for the shade SD must be disposed at a position which is rearward as far as possible as indicated by a rectangle 6' of a one-dot chain line in the figure. Alternatively, a location where the post or the support portion does not influence the light distribution may be located and the post or the support portion may be positioned at the location. This restriction reduces the degree of freedom of the design relating to the attachment of the shade SD.

By contrast, in the case where the portions 21 and 2*r* of the reflecting mirror which are indicated by a solid line in FIG. 3 are used, the correlations between the reflecting faces of the reflecting mirror and the irradiation ranges on the screen SCN are defined so that the reflecting faces and the respective irradiation ranges are positioned on the same sides with respect to the vertical plane including the main optical axis L—L. The post or the support portion for the shade SD does not interfere with reflected light from the reflecting faces of both the portions 21 and 2*r* or exerts influence of a very small degree on the reflected light. Therefore, influence of a shadow of the post or the support portion for the shade SD on the light distribution can be neglected. The lamp device of the invention is free from restriction on the position of the post or the support portion for the shade SD, and the position can be arbitrarily selected so as to be on the line of intersection of the vertical plane including the main optical axis L—L and the reflecting face of the reflecting mirror or in the vicinity of the line.

FIGS. 4 to 10 show an embodiment in which the invention is applied to a head lamp for an automobile.

A lamp device 7 which is substantially rectangular as seen from the front comprises the lamp body 8 which is opened in one end and made of a synthetic resin, and a front lens 9 which covers the opening of the lamp body 8. A metal halide lamp 11 which serves as a light source is disposed in a lamp space 10 defined by the lamp body and the front lens.

A reflecting mirror 12 is formed by applying a known reflection process on the inner face of the lamp body 8. The above-described configuration of the reflecting mirror 2 is applied to the reflecting mirror 12.

Figure 8:
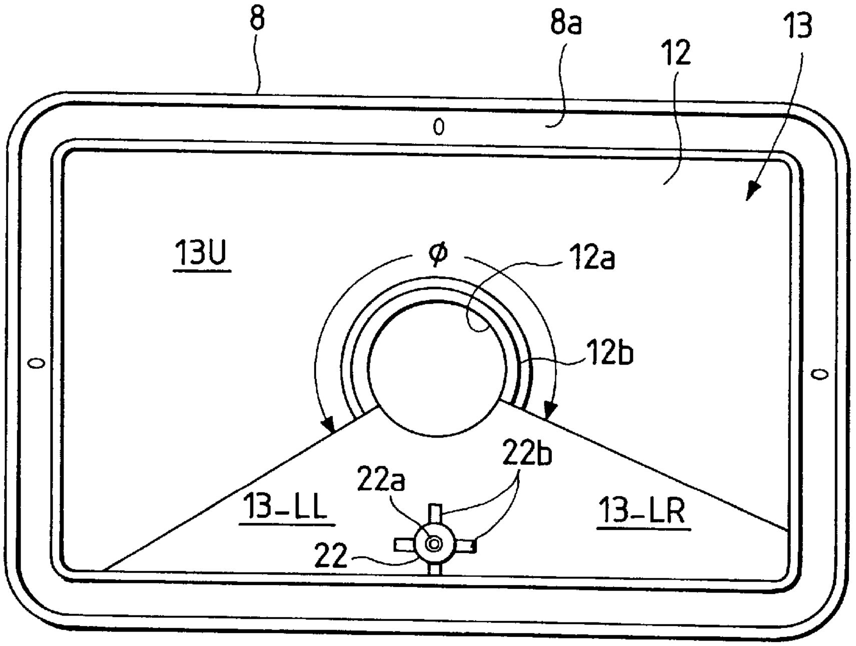
FIG. 8 is a front view of the lamp body.

As shown in a front view of FIG. 8, a circular hole 12*a* through which the metal halide lamp 11 is to be positioned in the lamp space 10 is formed in the center portion of the reflecting mirror 12. The main optical axis of the reflecting mirror 12 is set to be an axis which passes the center of the circular hole 12*a* and longitudinally elongates. In the area surrounding the circular hole 12*a*, a protrusion wall 12*b* which forward protrudes is formed in a predetermined angle range about the main optical axis.

The reflecting face 13 of the reflecting mirror 12 is divided into three regions 13_U, 13_LL, and 13_LR which are arranged about the main optical axis. All of these regions are formed into a shape of a paraboloid of revolution.

The region 13_U is positioned substantially higher than the horizontal plane which includes the main optical axis of the reflecting mirror 12 (in FIG. 8, the region is indicated by the angle range ϕ about the main optical axis). A part of the region reaches a position lower than the horizontal plane including the main optical axis of the reflecting mirror 12. The axis of revolution of the paraboloid of revolution which constitutes the face shape of the region 13_U coincides with the main optical axis of the reflecting mirror 12. The focal point of the paraboloid of revolution is at a position which is slightly more rearward than a reference point which is set as the light emission center of the metal halide lamp 11 and located on or in the vicinity of the main optical axis.

Both the regions 13_LL and 13_LR are positioned lower than the horizontal plane which includes the main optical axis of the reflecting mirror 12. As seen from the front, the region 13_LL is positioned on the left side of the vertical plane which includes the main optical axis of the reflecting mirror 12, and the region 13_LR is positioned on the right side of the vertical plane which includes the main optical axis of the reflecting mirror 12. The face shapes of these regions are defined by the above-mentioned method in which the axis of revolution of the paraboloid of revolution is inclined rightward or leftward. The region 13_LR corresponds to the portion 21, and the region 13_LL to the portion 2*r*. In the embodiment, the focal lengths of the paraboloids of revolution of the regions are equal to each other, and the focal points of the paraboloids of revolution are at a position which is slightly more forward than the reference point which is set as the light emission center of the metal halide lamp 11 and located on or in the vicinity of the main optical axis.

The configuration in which the curved faces of the regions 13_U, 13_LL, and 13_LR have a paraboloid of revolution has an advantage in that the faces can be simply configured and hence the reflecting mirror can be easily produced, but has a problem in that level differences formed in interfaces of the regions cause glare. Therefore, a countermeasure for the problem must be taken.

Figure 4:
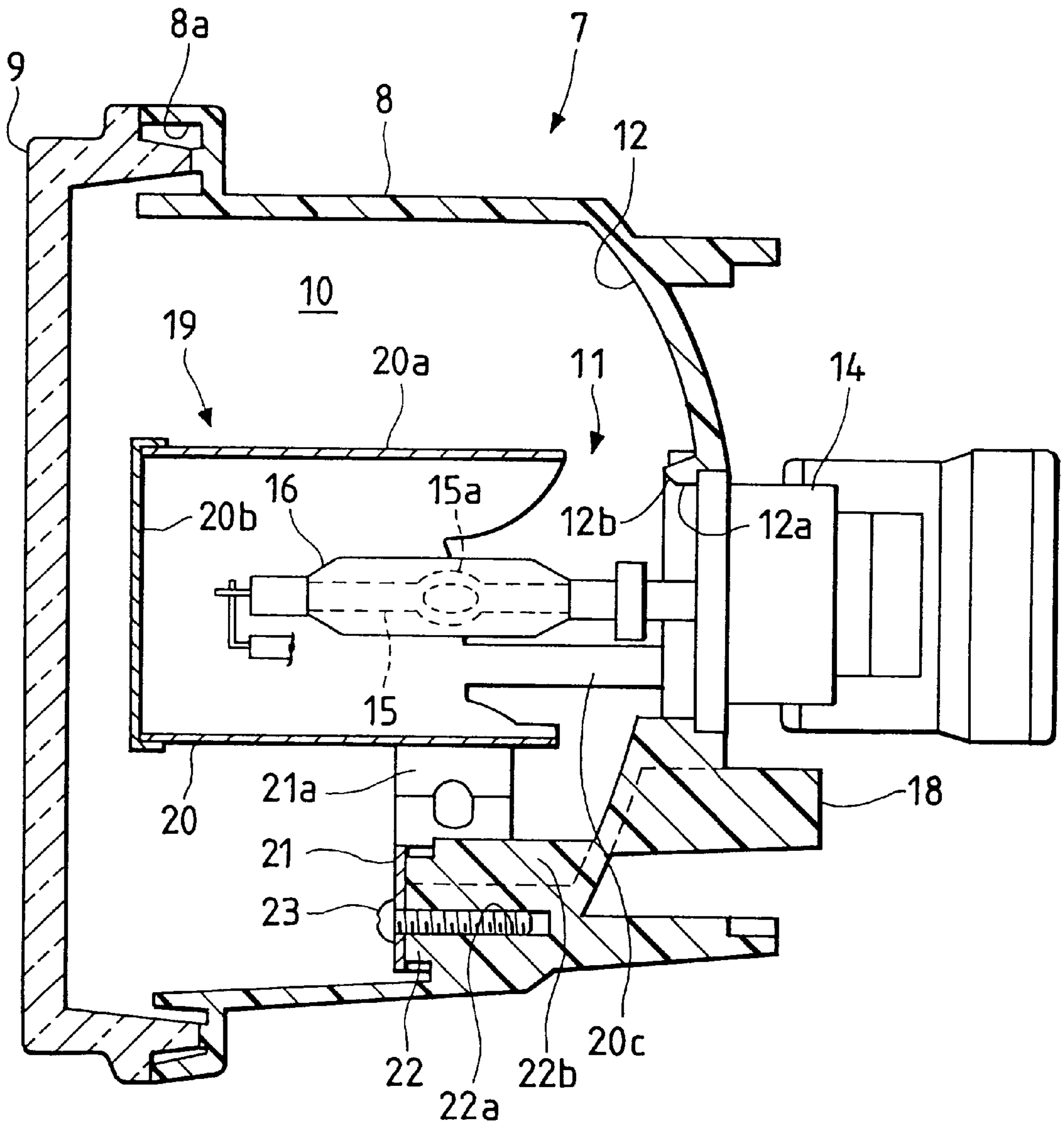
FIG. 4 is a view which cooperates with FIGS. 5 to 10 to show an embodiment of the invention and which is a longitudinal section view of the lamp device.
Figure 5:
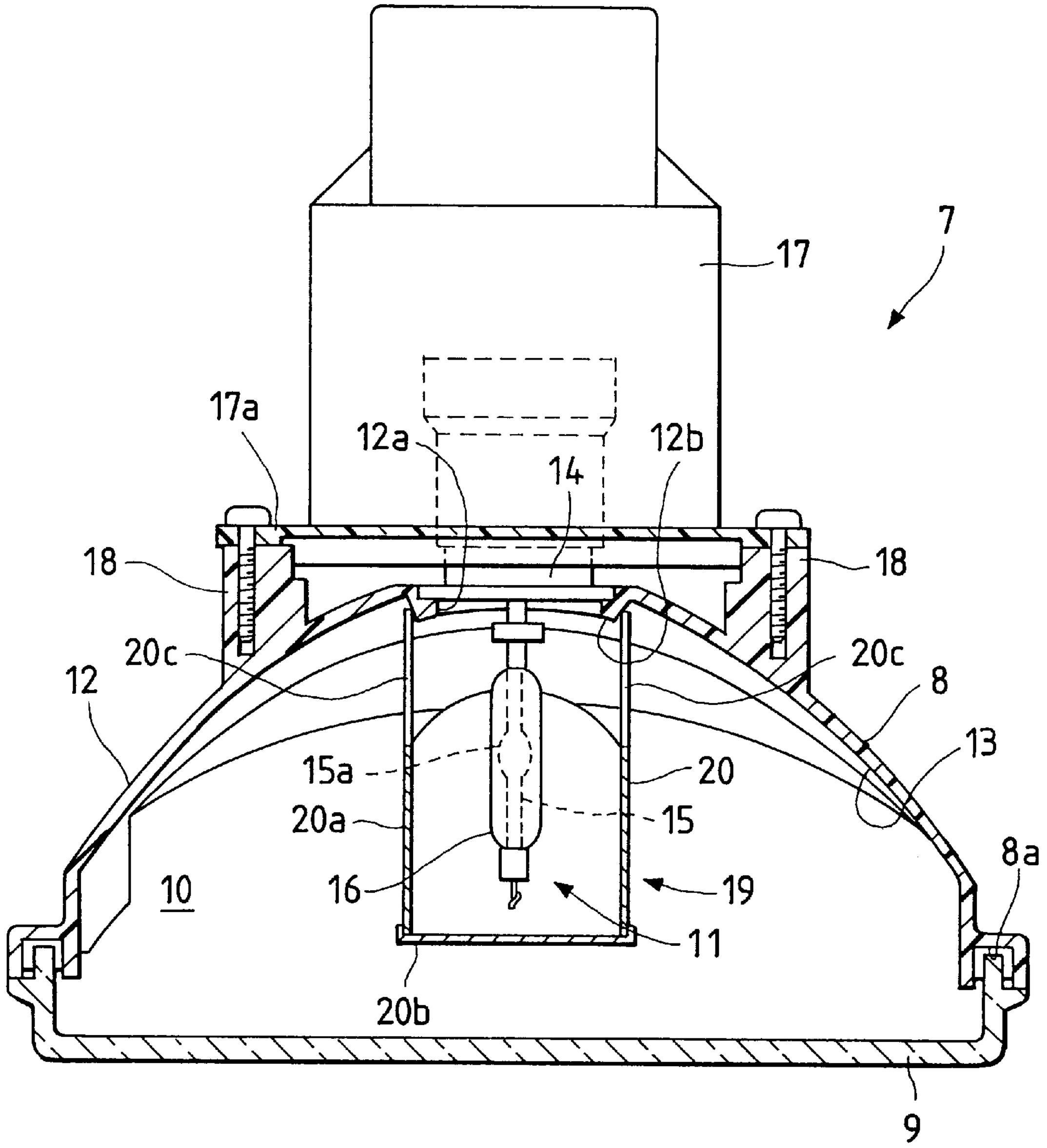
FIG. 5 is a horizontal section view showing the main portion of the lamp device.
Figure 6:
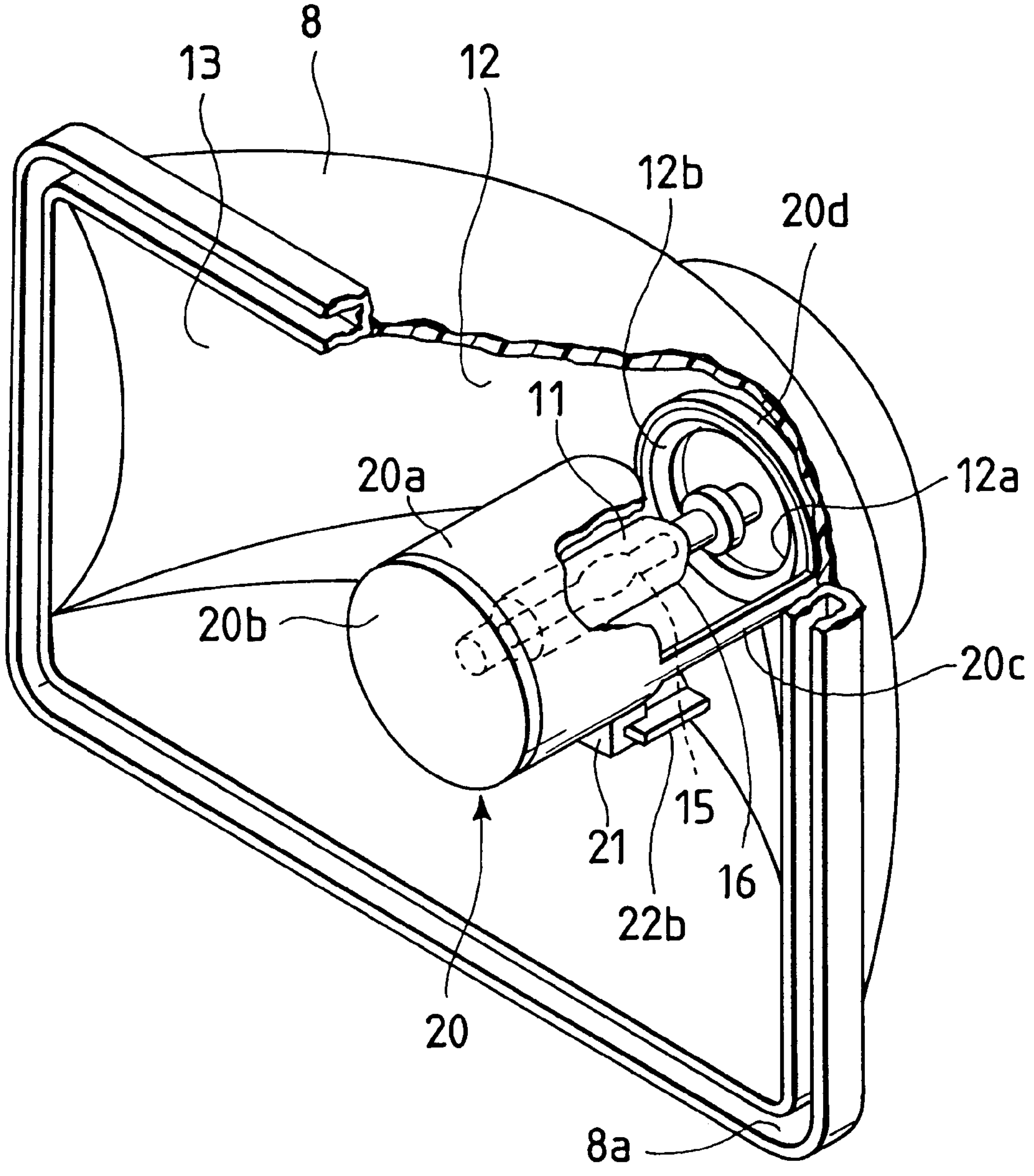
FIG. 6 is a perspective view of the lamp device from which a lens is detached, with being partially cutaway.
Figure 7:
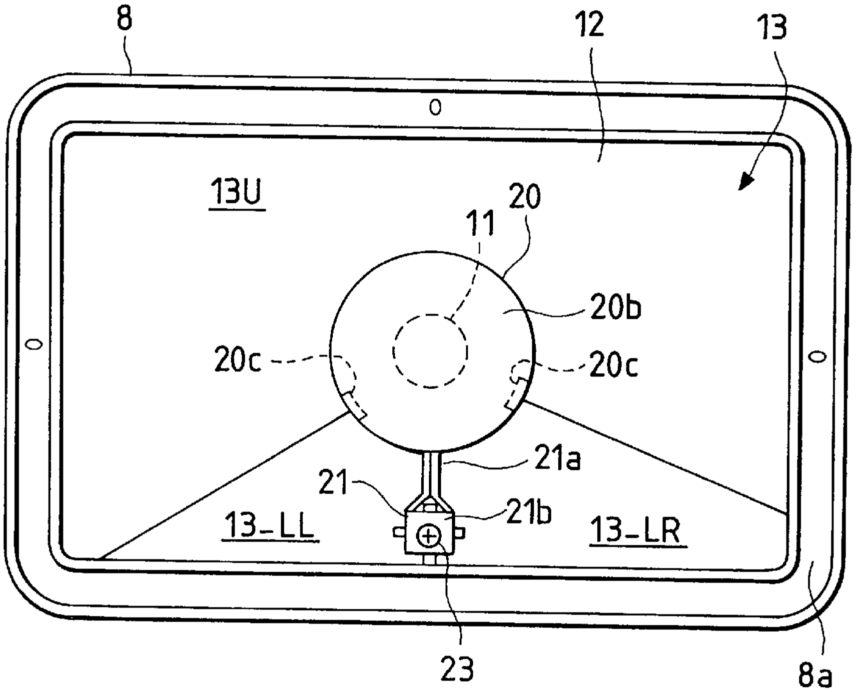
FIG. 7 is a front view showing a state in which the lens is detached.

As shown in FIGS. 4 and 5, the metal halide lamp 11 has an insulation base 14 and an arc tube 15. The center shaft of the arc tube 15 which protrudes from the insulation base 14 and is made of glass is attached to the lamp body 8 by means which is not shown, so as to elongate along the main optical axis of the reflecting mirror 12. A noble gas, mercury, a metal iodide, and the like are filled in a bulb 15*a* of the arc tube 15. A glass globe 16 which filters out harmful wavelength components in the ultraviolet region of light generated by arc discharge between a pair of electrodes is fixed to the arc tube 15 so as to surround the tube.

The reference numeral 17 designates a cover which is made of a metal and houses a starter circuit for the metal halide lamp 11 (see FIG. 5). A flange 17*a* which is formed at one end of the cover is fixed by screws to bosses 18 which rearward protrude from the back face of the lamp body 8, thereby attaching the cover to the lamp body 8. The rear end of the insulation base 14 of the metal halide lamp 11 is coupled to a member such as a socket in the cover. The member is connected to the starter circuit through wires so that the lamp can receive the supply of a start signal and the power.

The reference numeral 19 designates a shade which has a cylindrical main unit 20 and a post 21 for attaching the shade to the reflecting mirror 12. For example, the shade 19 may be formed in the following manner: a developed shape of the shade 19 is formed by punching a metal plate; the resulting metal plate is formed into a cylindrical shape; and black paint is then applied to the cylinder.

Figure 9:
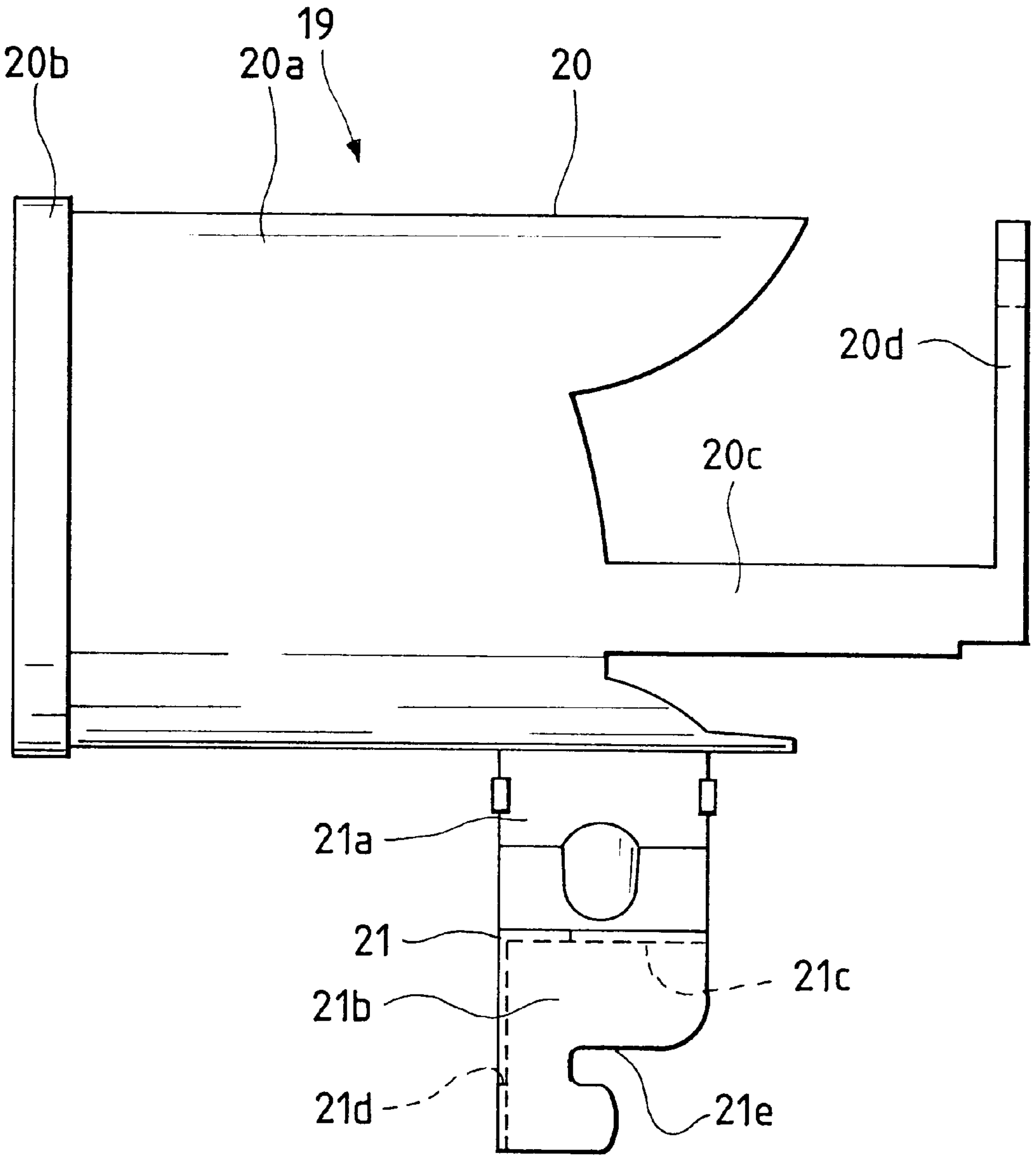
FIG. 9 is an enlarged side view of a shade.

As shown in FIG. 9, the main unit 20 of the shade 19 is configured by a cylindrical portion 20*a* and a front cover 20*b* which covers the front end opening of the cylindrical portion. The front cover 20*b* is fitted onto the front end portion of the cylindrical portion 20*a* and then fixed to the outer face of the cylindrical portion 20*a* by spot welding or the like.

In the rear end portion of the main unit 20 of the shade 19, a pair of shade pieces 20*c* which rearward elongate are formed so as to be integrated with the cylindrical portion 20*a* and separated from each other about the center axis of the cylindrical portion 20*a* by an angle which is substantially equal to the angle ϕ. The shade pieces 20*c* are disposed in order to intercept light emitted from the metal halide lamp 11 toward the interfaces of the regions 13_U, 13_LL, and 13_LR of the reflecting mirror 12, thereby eliminating unnecessary light which causes glare. An annular portion 20*d* having a diameter which is substantially equal to that of the cylindrical portion 20*a* is integrated with the end portions of the shade pieces 20*c* in such a manner that the annular portion bridges the shade pieces. The number and positions of the shade pieces 20*c* are adequately determined in accordance with the manner of dividing the reflecting face 13.

The post 21 of the shade 19 downward protrudes from the outer face of the cylindrical portion 20*a*, and consists of a connecting portion 21*a* which has an inverted Y-like shape as seen from the front, and an attaching portion 21*b* which is disposed at the lower end portion of the connecting portion and has a substantially square box-like shape. An opening 21*c* which is rearward directed is formed in the attaching portion 21*b*, and an insertion hole 21*d* is formed in the center of the front end face of the attaching portion.

As shown in FIG. 8, in the reflecting mirror 12, a boss 22 for fixing the attaching portion 21*b* to the reflecting mirror 12 forward protrudes from the interface of the regions 13_LL and 13_LR. A tapped hole 22*a* which opens at the front end and longitudinally elongates is formed at the center of the boss 22.

When the shade 19 is to be attached to the reflecting mirror 12, the main unit 20 of the shade 19 is moved toward the reflecting mirror 12 so as to surround the arc tube 15 and the globe 16 of the metal halide lamp 11, and the annular portion 20*d* of the shade 19 is fitted onto the protrusion wall 12*b* of the reflecting mirror 12, thereby positioning the shade 19. Thereafter, the attaching portion 21*b* of the post 21 is positioned in an outer fitting manner on the boss 22 of the reflecting mirror 12, and an attaching screw 23 is screwed into the tapped hole 22*a* of the boss 22 through the insertion hole 21*d* of the attaching portion 21*b*, whereby the attaching portion 21*b* of the post 21 is fixed to the boss 22. As shown in FIG. 8, plural ribs 22*b* are formed on the outer face of the boss 22 so as to be integrated with the boss 22. Slits 21*e* formed in the attaching portion 21*b* of the post 21 (in FIG. 9, only one of the slits is shown) are engaged with the ribs 22*b*, respectively, so that the shade 19 is prevented from being accidentally rotated.

The lens 9 is made of a glass material or a transparent synthetic resin. The lens 9 is attached to the lamp body 8 by means of adhesion or a lens presser or the like under the state where the outer edge of the lens is fitted into a lens mounting groove 8*a* formed in the front end portion of the lamp body 8. The lens steps formed on the lens 9 have a known shape having a function of diffusing reflected light from the reflecting face 13 of the reflecting mirror 12 mainly in horizontal directions (for example, fisheye lens steps). As described above, the optical design of the lens 9 is done so that, when the lens is divided into two regions by the vertical plane including the main optical axis of the reflecting mirror 12, the lens steps formed in the lens face positioned on one side with respect to the vertical plane act on reflected light from the reflecting face 13 corresponding to the lens face.

Figure 10:
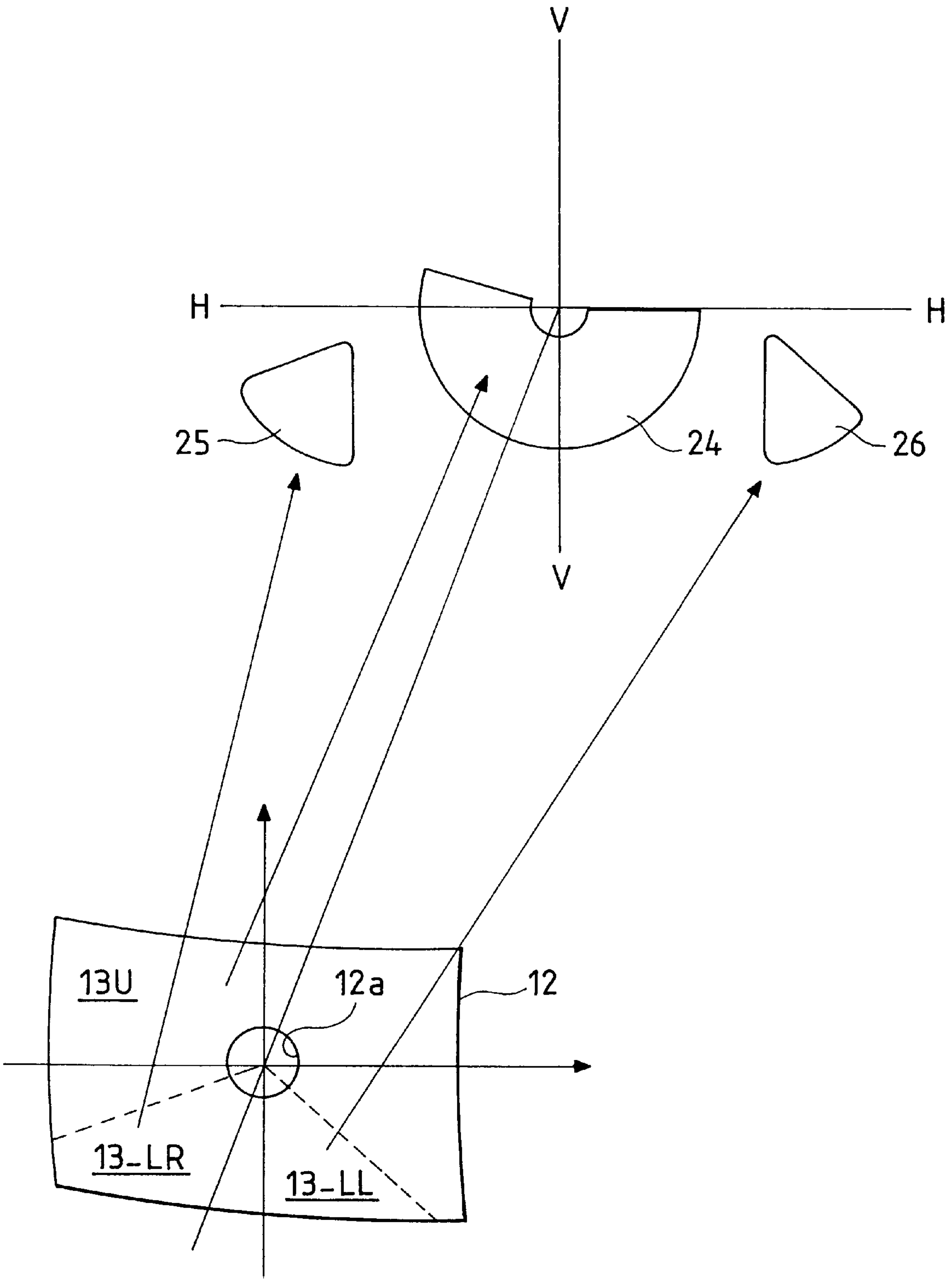
FIG. 10 is a view schematically showing correlations between reflecting regions and patterns projected by the reflecting regions.

FIG. 10 schematically shows correlations between an example of the patterns projected by the regions constituting the reflecting mirror 12, and the reflecting regions. Specifically, the figure shows an arrangement of patterns which are obtained when the metal halide lamp 11 is lit under the state where the lens 9 is detached from the lamp device 7. In the figure, the line "H—H" indicates a horizontal line where the horizontal plane including the main optical axis of the reflecting mirror 12 intersects the front screen, and the line "V—V" indicates a vertical line where the vertical plane including the main optical axis of the reflecting mirror 12 intersects the front screen.

The pattern 24 is formed by the region 13_U and has a sectorial shape which is centered in the vicinity of the intersection of the horizontal line "H—H" and the vertical line "V—V." The upper left edge portion which is inclined by a predetermined angle with respect to the horizontal line "H—H" contributes to the formation of the inclined cut line in the light distribution pattern through the lens function, and the upper right edge portion which elongates in substantially parallel to the horizontal line "H—H" contributes to the formation of the horizontal cut line in the light distribution pattern through the lens function.

The patterns 25 and 26 positioned lower than the horizontal line "H—H" and beside the pattern 24 are projected by the regions 13_LR, and 13_LL, respectively. The pattern 25 positioned on the left side of the pattern 24 is a pattern due to the region 13_LR, and the pattern 26 positioned on the right side of the pattern 24 is a pattern due to the region 13_LL. When the metal halide lamp 11 is lit, there may arise the case where a part of the filled material remains in a location near the lower portion of the bulb 15*a* of the arc tube 15, and the material causes light directed from the metal halide lamp 11 to the lower half face of the reflecting mirror 12 to be colored (for example, yellow light). In the reflecting mirror 12, for example, the patterns 25 and 26 due to the regions 13_LR, and 13_LL may be colored. The patterns are positioned on both sides of the pattern 24 which is colorless or substantially white, and the three patterns 24 to 26 are diffused in substantially horizontal directions by the function of the lens steps so as to be mixed with each other, whereby the light color is adjusted so that color unevenness dose not occur in the whole of the light distribution pattern.

In the embodiment described above, the reflecting face 13 of the reflecting mirror 12 is divided into the three regions. It is a matter of course that modes of embodying the invention are not restricted to such a manner of division and the invention is not restricted to a lamp device having a rectangular shape and may be applied to a wide variety of lamps such as those having a circular front shape.

As seen from the above description, according to the invention, when the reflecting mirror is divided into two regions by the vertical plane which includes the main optical axis of the reflecting mirror, reflected light from the reflecting regions or a part thereof does not concentrically pass through a certain range of the lens but passes through the lens with being distributed to the whole of the lens. Therefore, a local high temperature region is not produced in the lens. In the design of the lens steps formed in the lens, when the lens is divided into two portions by the vertical plane which includes the main optical axis of the reflecting mirror, the optical design of the lens steps can be independently conducted with respect to only reflected light from the reflecting region corresponding to one of the portions or a part of the reflecting region.

Further, according to the invention, even when a post disposed on a shade for preventing light of the light source from directly entering the lens and/or a support portion for the shade disposed on the reflecting mirror is attached to or formed on the reflecting mirror and on or in the vicinity of a line where the vertical plane which includes the main optical axis intersects the reflecting mirror, influence on the light distribution which is due to interception of reflected light by the post or the support portion can be eliminated or reduced.

Further, since the reflecting face of the reflecting mirror is divided into plural regions and the faces of these regions have a shape of a paraboloid of revolution, the configuration of the reflecting face can be simplified and the production cost can be reduced.

Further, the reflecting face of the portion of the reflecting mirror which is positioned substantially higher than the horizontal plane including the main optical axis of the reflecting mirror has a shape of a paraboloid of revolution, and that of the portion which is positioned substantially lower than the horizontal plane including the main optical axis of the reflecting mirror is made continuous to the reflecting face of the upper portion, whereby a level difference is prevented from being produced at the interface of the portions. As a result, it is possible to prevent glare from occurring.

Still further, in the case where the reflecting mirror is divided into plural regions about the main optical axis of the reflecting mirror, light intercepting means for intercepting light emitted from the light source toward a level difference formed at the interface of the regions is disposed, whereby light causing glare can be eliminated.

What is claimed is:

1. A lamp device for a vehicle comprising:

a reflecting mirror;

a lens in which lens steps for diffusing light are formed in a range corresponding to a reflecting face of said reflecting mirror; and a light source which is positioned between said reflecting mirror and said lens, wherein (A) reflected light from a first region of said reflecting face of said reflecting mirror, said first region being positioned on one side of said reflecting mirror with respect to a vertical plane which includes a main optical axis of said reflecting mirror and which divides said reflecting mirror into two regions, or from a part of said first region, propagates in a direction which is inclined with respect to the main optical axis of said reflecting mirror and diverges from the main optical axis without intersecting the vertical plane which includes the main optical axis of said reflecting mirror, and, when the vertical plane which includes the main optical axis of said reflecting mirror divides said lens into two portions, is emitted through lens steps formed in one of the two portions of said lens, said one of the two portions corresponding to said first region or said part of said first region, and (B) reflected light from a second region of said reflecting face of said reflecting mirror, said second region being positioned on a side of said reflecting mirror opposite to said first region with respect to the vertical plane which includes the main optical axis of said reflecting mirror and which divides said reflecting mirror into two regions, or from a part of said second region, propagates in a direction which is inclined with respect to the main optical axis of said reflecting mirror and diverges from the main optical axis without intersecting the vertical plane which includes the main optical axis of said reflecting mirror, and, when the vertical plane which includes the main optical axis of said reflecting mirror divides said lens into said two portions, is emitted through lens steps formed in the other one of the two portions of said lens, said other one of the two portions corresponding to said second region or said part of said second region.

2. A lamp device for a vehicle according to claim 1, further comprising a shade for intercepting light which directly impinges from said light source on said lens, and one or both of a post and a support portion for attaching said shade to said reflecting mirror, said post and said support portion being attached to or formed on said reflecting mirror at a position on or in a vicinity of a line where the vertical plane which includes the main optical axis intersects said reflecting mirror.

3. A lamp device for a vehicle according to claim 1 or 2, wherein said light source comprises a discharge lamp, said reflecting face having a portion which, when said reflecting mirror is divided into two portions by a horizontal plane which includes the main optical axis of said reflecting mirror, is positioned substantially higher than the horizontal plane and has a shape of a paraboloid of revolution, a focal point of said reflecting face in said portion being at a position closer to said reflecting mirror than a position which is set as a light emission center of said discharge lamp, and said reflecting face having another portion which is positioned lower than the horizontal plane which includes the main optical axis of said reflecting mirror and has a shape of a paraboloid of revolution, a focal point of said reflecting face in said another portion being at a position closer to said lens than the position which is set as the light emission center of said discharge lamp.

4. A lamp device for a vehicle according to claim 3, wherein a third region of said reflecting face which is positioned substantially lower than a horizontal plane which includes the main optical axis of said reflecting mirror and which, when said reflecting mirror is divided into said two regions by the vertical plane which includes the main optical axis of said reflecting mirror, is positioned on a left side of the vertical plane as seen from a front side, or a part of said third region, has a shape of a paraboloid of revolution, an axis of revolution of said paraboloid of revolution being inclined leftward with respect to the main optical axis of said reflecting mirror, and a fourth region of said reflecting face which is positioned substantially lower than the horizontal plane and on a right side of the vertical plane as seen from the front side, or a part of said fourth region, has a shape of a paraboloid of revolution, an axis of revolution of said paraboloid of revolution being inclined rightward with respect to the main optical axis of said reflecting mirror.

5. A lamp device for a vehicle according to claim 3, wherein said reflecting mirror is divided into plural regions about the main optical axis of said reflecting mirror, and comprising means for intercepting light emitted from said light source toward a level difference formed at an interface of said plural regions.

6. A lamp device for a vehicle according to claim 1 or 2, wherein a third region of said reflecting face which is positioned substantially lower than a horizontal plane which includes the main optical axis of said reflecting mirror and which, when said reflecting mirror is divided into said two regions by the vertical plane which includes the main optical axis of said reflecting mirror, is positioned on a left side of the vertical plane as seen from a front side, or a part of said third region, has a shape of a paraboloid of revolution, an axis of revolution of said paraboloid of revolution being inclined leftward with respect to the main optical axis of said reflecting mirror, and a fourth region of said reflecting face which is positioned substantially lower than the horizontal plane and on a right side of the vertical plane as seen from the front side, or a part of said fourth region, has a shape of a paraboloid of revolution, an axis of revolution of said paraboloid of revolution being inclined rightward with respect to the main optical axis of said reflecting mirror.

7. A lamp device for a vehicle according to claim 6, wherein said reflecting mirror is divided into plural regions about the main optical axis of said reflecting mirror, and comprising means for intercepting light emitted from said light source toward a level difference formed at an interface of said plural regions.

8. A lamp device for a vehicle according to claim 1 or 2, wherein said reflecting face has a first portion which, when said reflecting mirror is divided into another two regions by a horizontal plane which includes the main optical axis of said reflecting mirror, is positioned substantially higher than the horizontal plane and has a shape of a paraboloid of revolution, and said reflecting face has a second portion which is positioned substantially lower than the horizontal plane which includes the main optical axis of said reflecting mirror and is formed as a face which is continuous to said first portion of said reflecting face at an interface of said first and second portions of said reflecting face.

9. A lamp device for a vehicle according to claim 1 or 2, wherein said reflecting mirror is divided into plural regions about the main optical axis of said reflecting mirror, and comprising means for intercepting light emitted from said light source toward a level difference formed at an interface of said plural regions.

* * * * *